US008510930B1

(12) United States Patent
Chang

(10) Patent No.: US 8,510,930 B1
(45) Date of Patent: Aug. 20, 2013

(54) MANUFACTURING METHOD OF SHIELD TYPE MOTOR

(76) Inventor: Fang-Fu Chang, Taipei (TW)

( * ) Notice: Subject to any disclaimer, the term of this patent is extended or adjusted under 35 U.S.C. 154(b) by 0 days.

(21) Appl. No.: 13/372,225

(22) Filed: Feb. 13, 2012

(51) Int. Cl.
 *H02K 15/00* (2006.01)
(52) U.S. Cl.
 USPC .................................. 29/596; 29/597; 29/598
(58) Field of Classification Search
 USPC ............ 29/596–598, 732–735; 264/4, 209.1, 264/271.1, 279.1; 310/216–218
 See application file for complete search history.

(56) References Cited

U.S. PATENT DOCUMENTS

| 3,165,816 | A * | 1/1965 | Wightman et al. ............. 29/596 |
| 6,235,074 | B1 * | 5/2001 | Murano et al. ............... 75/10.14 |
| 6,791,231 | B2 * | 9/2004 | Chang ..................... 310/216.074 |
| 7,365,940 | B2 * | 4/2008 | Yamamoto et al. ......... 360/99.08 |
| 2001/0030483 | A1 * | 10/2001 | Masumoto et al. ........... 310/216 |
| 2003/0185473 | A1 * | 10/2003 | Gomyo et al. ................ 384/107 |
| 2005/0218735 | A1 * | 10/2005 | Herndon et al. ................ 310/90 |

* cited by examiner

*Primary Examiner* — Minh Trinh

(57) ABSTRACT

A manufacturing method of shield type motor includes the following steps: a): providing an iron core; b): providing a plastic shell and having the exterior face of the plastic shell press against the interior face of the iron core; c): providing a plurality of connected enamel-covered coils for being wound around the bobbin; d): providing a wire fastener for bundling the first material of plastics and the second material of plastics; e): providing a protecting jacket to be connected to the plastic shell and for containing the plurality of enamel-covered coils; f): providing a mold to let the iron core place in the mold and having the first material of plastics teem into the mold; g): having the second material of plastics teem into the mold; and h): removing the mold to expose a main body.

2 Claims, 5 Drawing Sheets

MANUFACTURING METHOD OF SHIELD TYPE MOTOR

BACKGROUND OF THE INVENTION

1. Field of the Invention

The invention relates to a manufacturing method of shield type motor, and more particularly, to a manufacturing method of shield type motor that makes use of separating the protecting plastics from the enamel-covered coil to make the process of having a high-temperature thermosetting material be teemed into a mold without damaging the enamel-covered coil.

2. Description of the Prior Art

The manufacturing method of shield type motor of the prior art firstly provides an iron core having a plurality of bobbins. Afterward, an insulator is added to the iron core. Moreover, after each of the bobbins is wound with enamel-covered coil, a plastic cloth is pasted outside the enamel-covered coil. Finally, the structure is placed into a mold and a plastic material is teemed into the mold. After the plastic material is cool off, the shell of a shield type motor is formed.

Nevertheless, in the manufacturing method of shield type motor of the prior art, since the above-mentioned plastics in the common insulated structure of shield type motor coil is made of thermosetting material, the following shortcomings in the manufacturing process can occur. Firstly, direct teeming of the plastics is apt to thrust off the enamel-covered coil. Secondly, the glass fiber contained in the plastics can damage the insulated enamel in the exterior layer covering the coil during the flowing of the casting plastic. Thirdly, deformation can be generated in the iron core subjected to the excessive pressure during the punch-cast forming process. All of these shortcomings of manufacturing process will result in the increase in NPL ratio and excessive scrap producing, and consequently, increasing the raising of production cost.

Therefore, just how to resolve the above-mentioned problems and improve the design of the insulated structure of shield type motor coil has becomes necessary for the industry. This is the origin to have the invention,

SUMMARY OF THE INVENTION

In light of the above-mentioned disadvantages of the prior art, the invention provides a "manufacturing method of shield type motor" that is capable of overcoming the shortcomings of the prior art, satisfying the requirements of the industry, as well as improving the competitiveness in the market. It aims to ameliorate at least some of the disadvantages of the prior art or to provide a useful alternative.

The primary objective of the invention is to provide a "manufacturing method of shield type motor" to make use of separating the protecting plastics from the enamel-covered coil to make the process of having a high-temperature thermosetting material be teemed into a mold without damaging the enamel-covered coil.

The secondary objective of the invention is to provide a "manufacturing method of shield type motor" to make use of forming a plurality of supporting posts which is capable of protecting the iron core from being damaged to generate deformation by the pressure during the teeming process into a mold, thereby to achieve a high efficacy of manufacturing yield when a bulk mold plastic material is teemed into a mold.

To achieve the above-mentioned objectives, the manufacturing method of shield type motor of the invention includes the following steps:

Step (a): providing an iron core that has a plurality of bobbins;

Step (b): providing a plastic shell that has a plurality of insulators and having the exterior face of the plastic shell press against the interior face of the iron core, also letting each of the insulator one-to-one correspondent to the bobbin;

Step (c): providing a plurality of connected enamel-covered coils and each of the enamel-covered coils is correspondent to and is wound around the bobbin; the plurality of enamel-covered coils has a first connecting lead and a second connecting lead extended therefrom;

Step (d): providing a wire fastener, which is secured on the plastic shell, for bundling the first material of plastics and the second material of plastics;

Step (e): providing a protecting jacket to be connected to the plastic shell; the protecting jacket has a containing space for containing the plurality of enamel-covered coils;

Step (f): providing a mold to let the iron core, which has the protecting jacket, place in the mold, and the first material of plastics is teemed into the mold;

Step (g): having the second material of plastics teem into the mold;

Step (h): Removing the mold to expose a main body which has an open slot and a flange.

To achieve the above-mentioned objectives, the Step (h) of the manufacturing method of shield type motor of the invention further includes the following steps:

Step (i): providing a capacitor to be electrically connected to the first connecting lead;

Step (j): providing a fastener which is correspondent to the wire fastener and which makes the fastener position in the open slot;

Step (k): providing an exterior cover for covering the capacitor and for being connected to the flange.

The accomplishment of the above-mentioned objectives of the invention will become apparent from the following description and its accompanied drawings of which:

DETAILED DESCRIPTION OF THE PREFERRED EMBODIMENT

Figure 1:
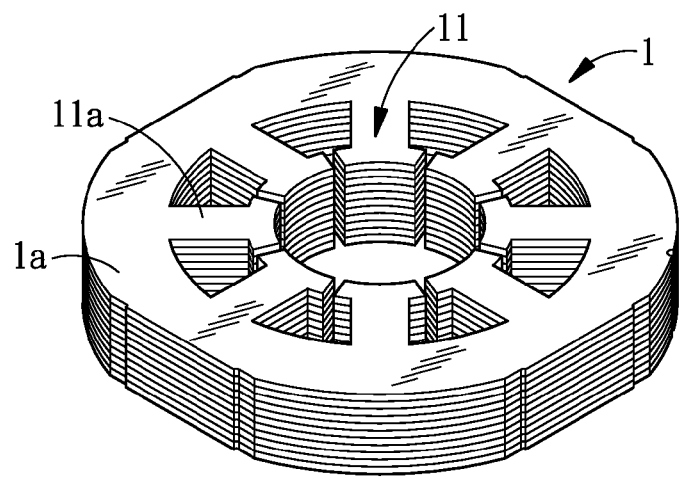
FIG. 1 is a schematic-and-isometric view of the iron core structure of a preferred embodiment of the shield type motor of the invention.

FIG. 1 is a schematic-and-isometric view of the iron core structure of a preferred embodiment of the shield type motor of the invention. As shown in FIG. 1, the manufacturing method of shield type motor of the invention provides an iron core (1) which being made of high permeability material is manufactured by punching process and is stacked up by a plurality of iron core plates (1a). Each of the iron core plates (1a) has a plurality of bobbin plates (11a) which are stacked up to form a iron core (1) that has a plurality of bobbins (11).

Figure 2:
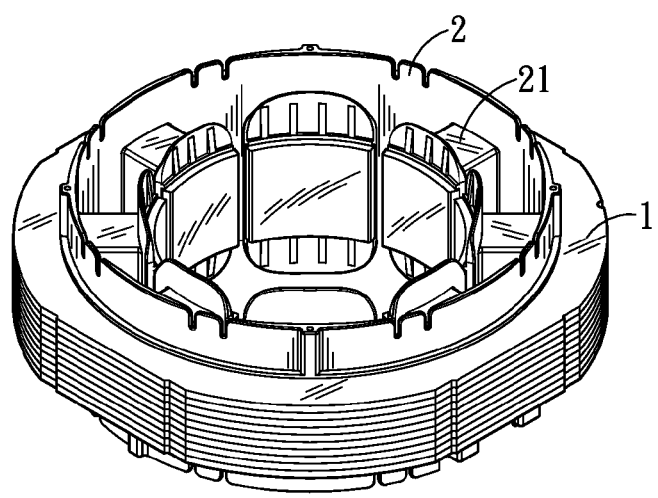
FIG. 2 is a schematic-and-isometric view of the iron core structure having two plastic shell bodies of a preferred embodiment of the shield type motor of the invention.

FIG. 2 is a schematic-and-isometric view of the iron core structure having two plastic shell bodies of a preferred embodiment of the shield type motor of the invention. As shown in FIG. 2, the manufacturing method of shield type motor in a preferred embodiment of the invention has an iron core (1) that is furnished in each of the upper and lower parts thereof and the exterior parts of each of which is one-to-one correspondent to and tightly pressed against the interior part of the iron core (1). The iron core (1) further has a plurality of insulators (21) that are one-to-one correspondent and are pressed against the bobbin (11).

Figure 3:
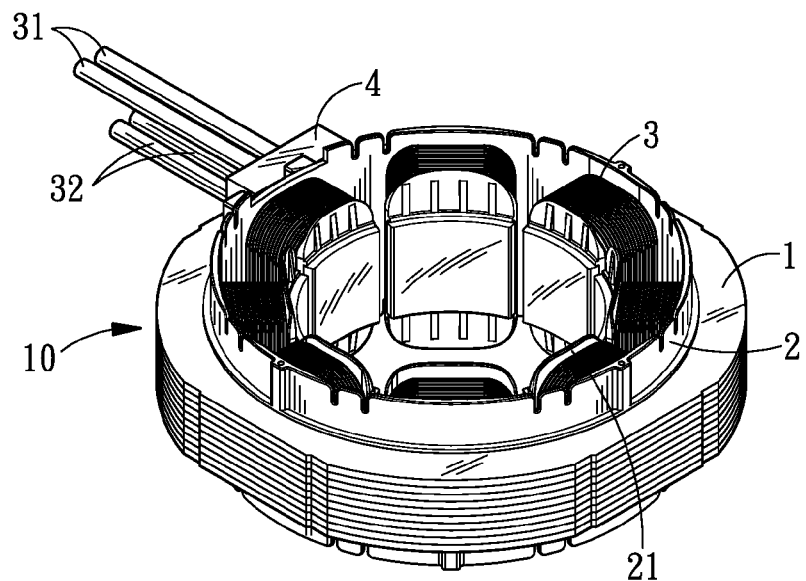
FIG. 3 is a schematic-and-isometric view of the iron core structure wound by a plurality of enamel-covered coils of a preferred embodiment of the shield type motor of the invention.

FIG. 3 is a schematic-and-isometric view of the iron core structure wound by a plurality of enamel-covered coils of a preferred embodiment of the shield type motor of the invention. As shown in FIG. 3, in the manufacturing method of shield type motor of the invention, each of the insulators (21) of the plastic shell (2) is one-to-one correspondent to and is wound around by an enamel-covered coil (3) respectively. The plurality of enamel-covered coils (3) are mutually connected one another. The plurality of the enamel-covered coils (3) has a first connecting lead (31) and a second connecting lead (32) extended therefrom. In a preferred embodiment of the invention, a wire fastener (4) secured at the plastic shell (2) is also provided to bundle both of the first connecting lead (31) and the second connecting lead (32) together.

Figure 4:
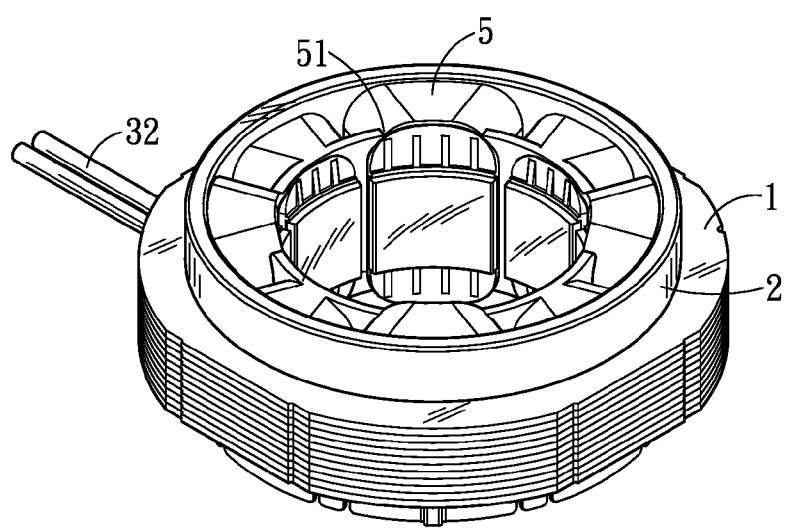
FIG. 4 is a schematic-and-isometric view of the iron core structure with the multiplicity of enamel-covered coils having protecting outer jackets added of a preferred embodiment of the shield type motor of the invention.

FIG. 4 is a schematic-and-isometric view of the iron core structure with the multiplicity of enamel-covered coils having protecting outer jackets added of a preferred embodiment of the shield type motor of the invention. As shown in FIG. 4, a protecting jacket (5) covering the enamel-covered coil (3) is furnished. The protecting jacket (5) being connected to the plastic shell (2) has a containing space (51) for containing the plurality of enamel-covered coils (3).

Figure 5:
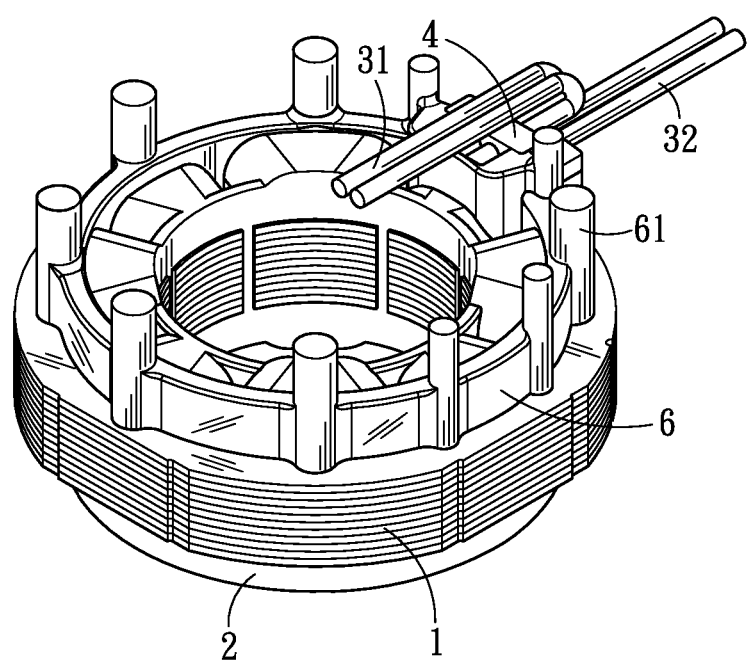
FIG. 5 is a schematic-and-isometric view of protecting jacket having a first material of plastics formed out there of a preferred embodiment of the shield type motor of the invention.

FIG. 5 is a schematic-and-isometric view of protecting jacket having a first material of plastics formed out there of a preferred embodiment of the shield type motor of the invention. As shown in FIG. 5, the manufacturing method of shield type motor of the invention further provides a mold (not shown in the Figure) and has the iron core (1) having the protecting jacket (5) place in the mold. A plurality of supporting posts (61) is furnished on a first material of plastics (6). Afterward, the first material of plastics (6) is teemed into the mold (not shown). As the first material of plastics (6) is a thermosetting material, it is good in flowing property. Therefore, the frictional damage to the enamel-covered coil (3) is relatively less.

Figure 6:
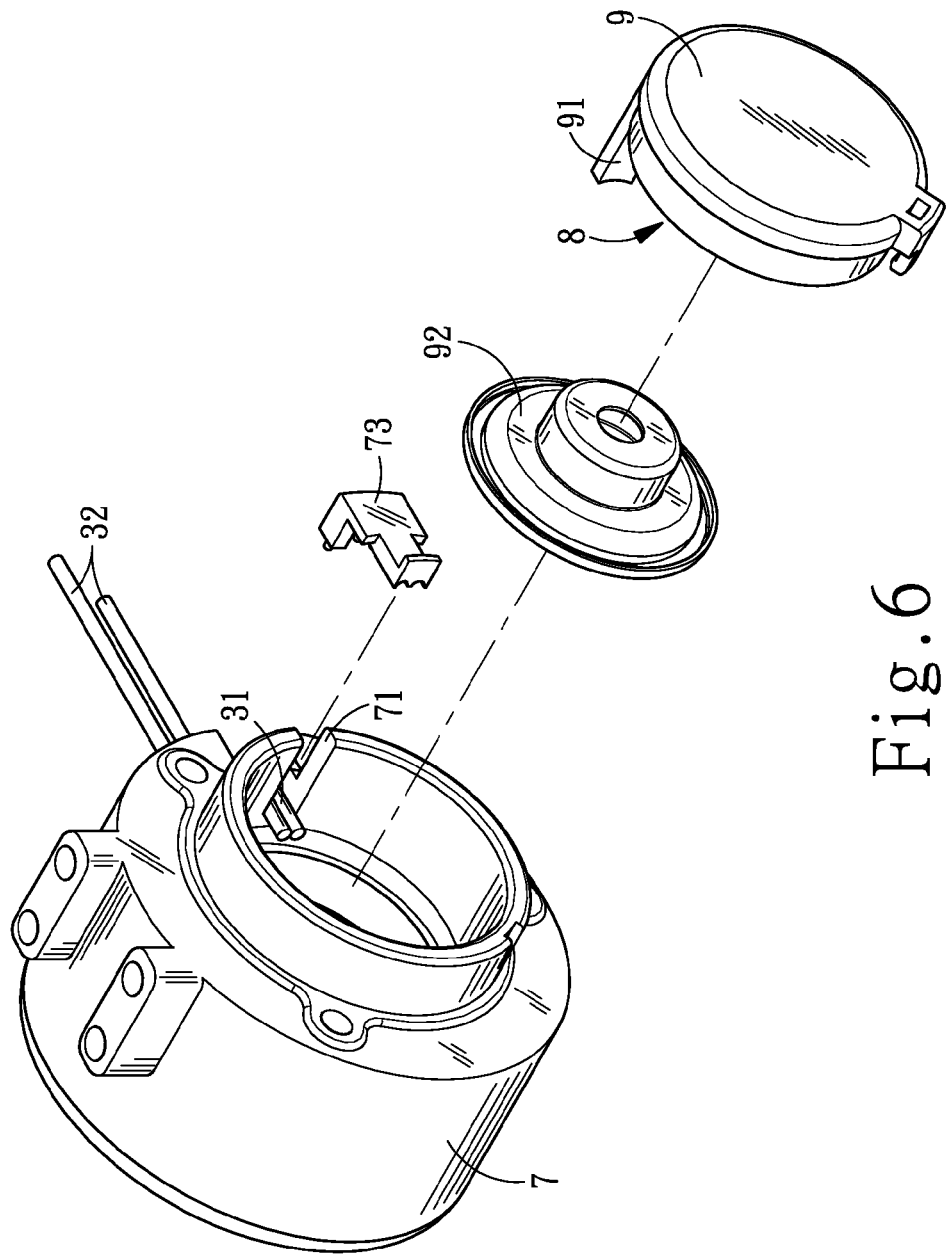
FIG. 6 is a schematic-and-isometric view of protecting jacket having second material of plastics formed out of the first material of plastics of a preferred embodiment of the shield type motor of the invention.

FIG. 6 is a schematic-and-isometric view of protecting jacket having second material of plastics formed out of the first material of plastics of a preferred embodiment of the shield type motor of the invention. As shown in FIG. 6, after the first material of plastics (6) (see FIG. 5) is cooled off, a second material of plastics (7) is teemed into the mold (not shown) and afterward, the mold is removed to form a main body (10) which has a flange (72) and an open slot (71).

Figure 7:
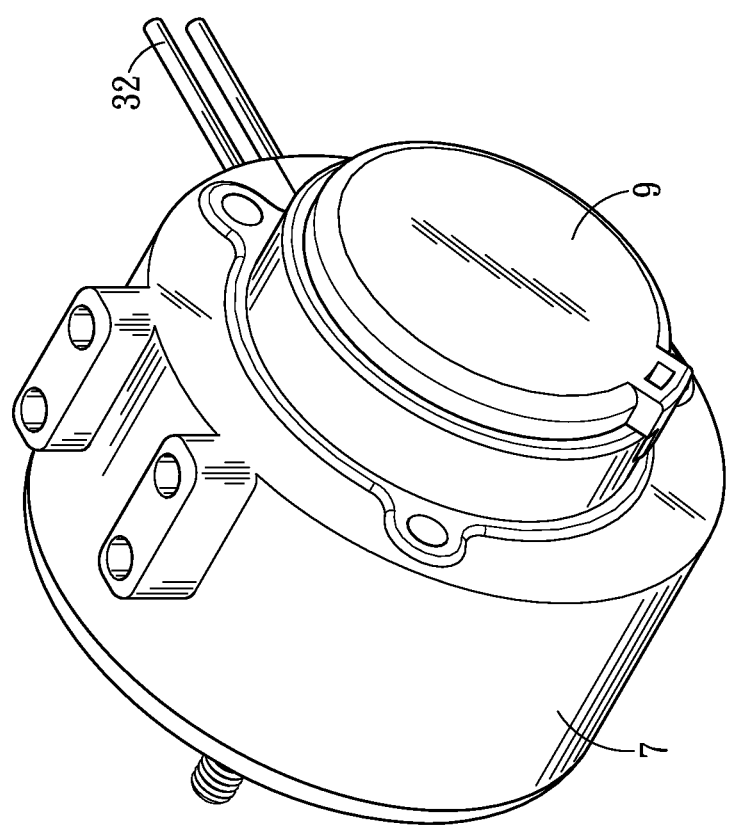
FIG. 7 is an exploded-and-isometric view of a preferred embodiment of the shield type motor of the invention having the assembled exterior cover finished.

FIG. 7 is an exploded-and-isometric view of a preferred embodiment of the shield type motor of the invention having the assembled exterior cover finished. As shown in FIG. 6 and FIG. 7, in a preferred embodiment of the invention, the second material of plastics (7) further provides a capacitor (8), a fastener (73), and an exterior cover (9). The fastener (73) is correspondent to the wire fastener (4) (see FIG. 4) which is placed in the open slot (71) to be protected. The fastener (73) further provides the first connecting lead (31) to be passed through to make the capacitor (8) electrically connect to the first connecting lead (31). Thereafter, the capacitor (8) is covered by the exterior cover (9) and the exterior cover (9) is connected to the flange (72).

As a conclusion, the manufacturing method of shield type motor of the invention includes the following steps:

Step (a): providing an iron core (1) that has a plurality of bobbins (11);

Step (b): providing a plastic shell (2) that has a plurality of insulators (21) and having the exterior face of the plastic shell (2) press against the interior face of the iron core (1), also letting each of the insulator (21) one-to-one correspondent to the bobbin (11);

Step (c): providing a plurality of connected enamel-covered coils (3) and each of the enamel-covered coils (3) is correspondent to and is wound around the bobbin (11); the plurality of enamel-covered coils (3) has a first connecting lead (31) and a second connecting lead (32) extended therefrom;

Step (d): providing a wire fastener (4), which is secured on the plastic shell (2), for bundling the first material of plastics (6) and the second material of plastics (7);

Step (e): providing a protecting jacket (5) to be connected to the plastic shell (2); the protecting jacket (5) has a containing space (51) for containing the plurality of enamel-covered coils (3);

Step (f): providing a mold to let the iron core (1), which has the protecting jacket (5), place in the mold, and the first material of plastics (6) is teemed into the mold;

Step (g): having the second material of plastics (7) teem into the mold;

Step (h): Removing the mold to expose a main body (10) which has an open slot (71) and a flange (72).

In a preferred embodiment of the manufacturing method of shield type motor of the invention, the Step (h) further includes the following steps:

Step (i): providing a capacitor (8) to be electrically connected to the first connecting lead (31);

Step (j): providing a fastener (73) which is correspondent to the wire fastener (4) and which make the fastener (73) position in the open slot (71);

Step (k): providing an exterior cover (9) for covering the capacitor (8) and for being connected to the flange (72).

It will become apparent to those people skilled in the art that various modifications and variations can be made to the structure of the invention without departing from the scope or spirit of the invention. In view of the foregoing description, it is intended that all the modifications and variation fall within the scope of the following appended claims and their equivalents.

What is claimed is:

1. A manufacturing method of shield type motor, comprising the following steps:

a) providing an iron core that has a plurality of bobbins;
   b) providing a plastic shell that has a plurality of insulators and having the exterior face of the plastic shell press against the interior face of the iron core, also letting each of the insulator one-to-one correspondent to the bobbin;
   c) providing a plurality of connected enamel-covered coils and each of the enamel-covered coils is correspondent to and is wound around the bobbin; the plurality of enamel-covered coils has a first connecting lead and a second connecting lead extended therefrom;

d) providing a wire fastener, which is secured on the plastic shell, for bundling the first material of plastics and the second material of plastics;
e) providing a protecting jacket to be connected to the plastic shell; the protecting jacket has a containing space for containing the plurality of enamel-covered coils;
f) providing a mold to let the iron core, which has the protecting jacket, place in the mold, and the first material of plastics is teemed into the mold;
g) having the second material of plastics teem into the mold; and
h) removing the mold to expose a main body which has an open slot and a flange.

2. The manufacturing method of shield type motor as claimed in claim 1, wherein the Step (h) further comprising the following steps:
i) providing a capacitor to be electrically connected to the first connecting lead;
j) providing a fastener which is correspondent to the wire fastener and which makes the fastener position in the open slot; and
k) providing an exterior cover for covering the capacitor and for being connected to the flange.

* * * * *